Aug. 25, 1942.  W. C. HANSEN  2,293,820
CLEANER
Filed Feb. 14, 1940  2 Sheets-Sheet 2
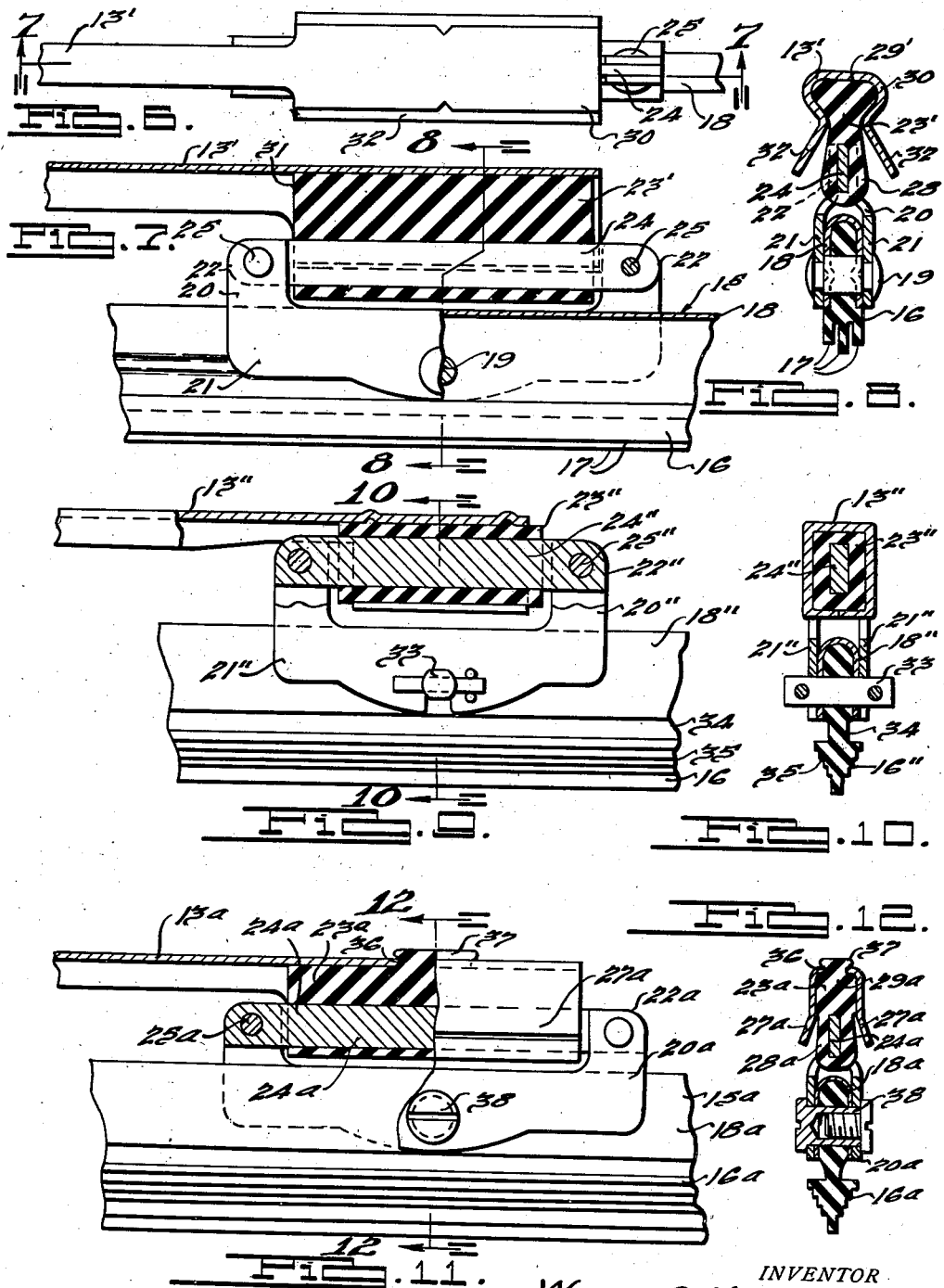
INVENTOR
Wray C. Hansen.
BY Harness, Lind, Pates & Harris.
ATTORNEYS.

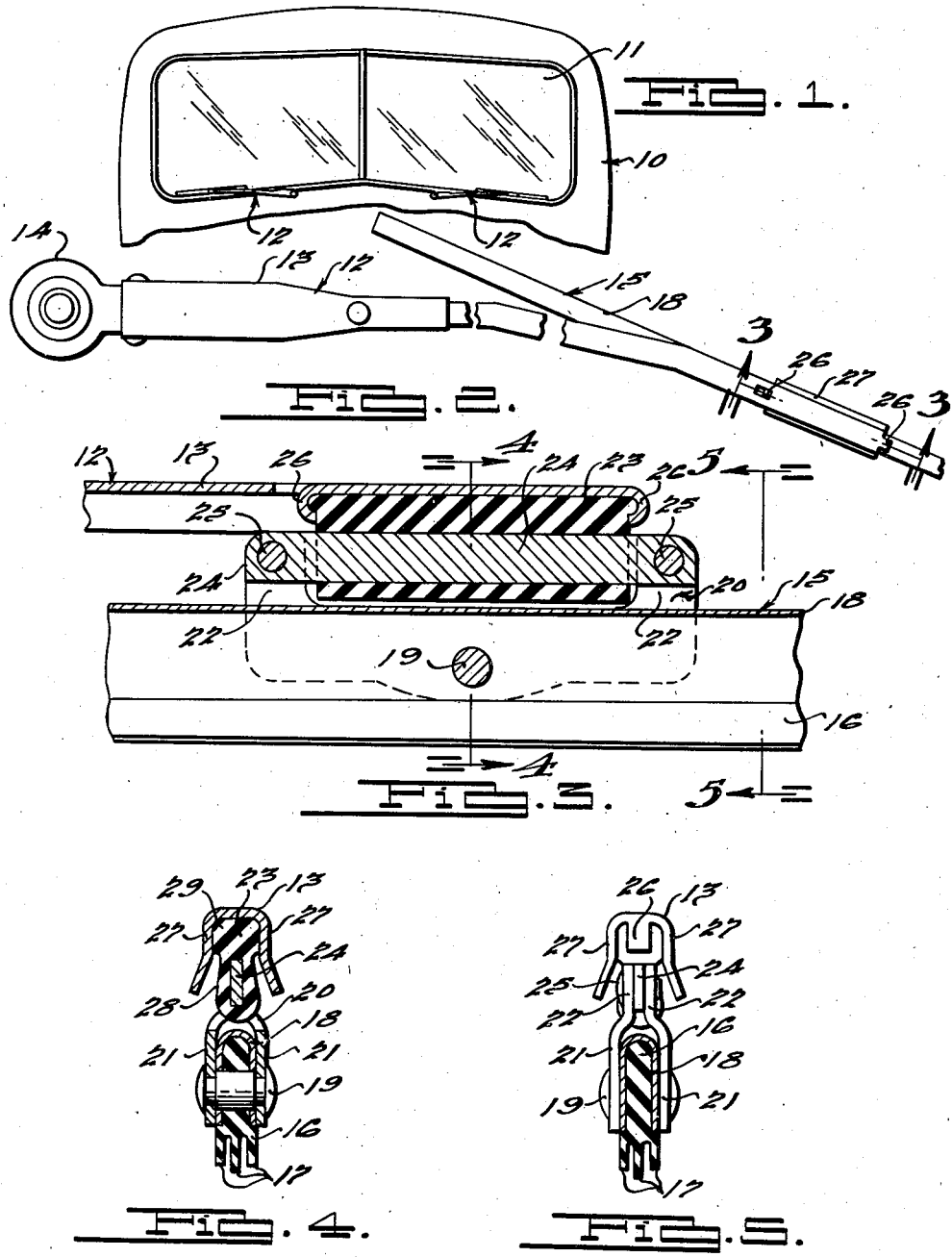

Patented Aug. 25, 1942

2,293,820

UNITED STATES PATENT OFFICE 2,293,820

CLEANER

Wray C. Hansen, Highland Park, Mich., assignor to Chrysler Corporation, Highland Park, Mich., a corporation of Delaware Application February 14, 1940, Serial No. 318,807

6 Claims. (Cl. 15—250)

This invention relates to a cleaner and more particularly to a cleaner of the type which is adapted for reciprocatory movement over the surface to be cleaned.

The invention is illustrated and described in connection with a cleaner for a windshield for which it is particularly adapted, although it will be understood that the invention in its broader aspects is not limited to such application.

Cleaners of the foregoing type include a wiper element adapted to be reciprocated by an actuating member over the surface to be cleaned, the wiper element including a flexible non-metallic wiping strip and a relatively rigid backing therefor, the element being detachably secured to the arm. It has been found advantageous to have the wiper element inclined with respect to the plane of the surface to be wiped during cleaning operation, the non-wiping edge of the element being inclined toward the direction of travel. When, however, this direction is changed, there is a corresponding change in the inclination.

Among the objects of this invention are the provision of an improved connection between the actuating arm and the wiper element to accommodate movement of the latter relative to the arm; to provide a connection of this character which will improve the wiping or cleaning action of the wiper element and which will minimize, if not entirely eliminate, noise incident to operation and particularly to eliminate noise resulting from changing the direction of movement of the wiper; and to provide a connection which will enable the wiping element to more readily flex and yield to conform to the surface to be wiped.

Other objects of the invention are to provide in a connection of the foregoing type, improved means for detachably securing the wiper element to the actuating arm; to provide a connection preferably including yieldable non-metallic material such as rubber or a material having the characteristics of the latter, at least a portion of which is retained against bodily pivotal movement with respect to one of the members which it connects; and to provide a connection wherein relative pivotal movement occurs between portions of the connecting material, such portions being retained against bodily pivotal movement relative to the respective parts of the cleaner to which they are secured.

Other objects of the invention will be more apparent from the following description taken in connection with the drawings, in which:

Fig. 1 is a fragmentary elevational view of the front portion of a vehicle body including a windshield having the improved cleaner associated therewith.

Fig. 2 is an enlarged side elevational view of the cleaner shown in Fig. 1.

Fig. 3 is a longitudinal sectional view as indicated by the line 3—3 of Fig. 2.

Figs. 4 and 5 are transverse sectional views taken on the lines 4—4 and 5—5 respectively of Fig. 3.

Fig. 6 is a fragmentary top plan view of a cleaner embodying a modified form of the invention.

Fig. 7 is a longitudinal sectional view as indicated by the line 7—7 of Fig. 6.

Fig. 8 is a transverse sectional view taken on the line 8—8 of Fig. 7.

Fig. 9 is a view similar to Fig. 3 but illustrating a modified form of the invention.

Fig. 10 is a transverse sectional view taken on line 10—10 of Fig. 9.

Fig. 11 is a view similar to Figs. 3, 7 and 9 but illustrating a further modification of the invention.

Fig. 12 is a transverse sectional view taken on the line 12—12 of Fig. 11.

The invention is illustrated and described in connection with a vehicle body 10 having the usual windshield 11 with which are associated two cleaners 12 embodying the invention. The latter are adapted for oscillatory movement over portions of the width of the windshield, although it will be understood that the invention may be utilized in connection with similar cleaners adapted for other forms of reciprocatory movement over the surface to be cleaned. The cleaner includes an actuating arm 13 having a portion 14 adapted to be secured to an actuating shaft, not shown, the portion 13 being channel-shaped and opening toward the windshield surface. Detachably secured to the arm 13 is a wiper blade indicated at 15 including a flexible non-metallic wiper strip 16 preferably of rubber, having laterally spaced wiping sections 17 engageable with the surface of the windshield. A channel-shaped relatively rigid backing or carrier 18 is secured to the strip 16 by a rivet 19 which also extends through a mounting member 20 which is adapted for pivotal movement relative to the blade about a tranverse axis defined by the rivet 19. The member 20 includes a pair of spaced side flanges 21 receiving the blade therebetween and engaged by the rivet 19 and is also provided with a pair of spaced flanges 22 at each end thereof.

The arm 13 is operatively connected to the blade 15 by a body of yieldable non-metallic material 23, preferably rubber or a material having the characteristics of the latter. Embedded in the material 23 is a connecting member 24 having projecting end portions which are secured by rivets 25 to a respective pair of flanges 22 of the member 20. The arm 13 has a pair of flanges 26 spaced longitudinally with respect thereto and integral with the top wall or web thereof, these flanges being shaped to receive therebetween an attaching beaded portion of the material 23. In attaching the blade 15 to the arm 13, the material 23 is forcibly deformed, intermediate the ends thereof, so that the latter may be inserted between the flanges 26 and the material is then permitted to resume its normal shape whereupon it is relatively firmly held between the latter flanges.

The arm 13 has side flanges 27 which engage a portion only of the material 23, as is more clearly shown in Fig. 4, the portion so engaged being, in effect, the attaching portion which is retained by the flanges against bodily movement with respect to the arm 13. In order to accommodate movement of the wiper blade 15 relative to the arm 13, the flanges 27 are laterally spaced from the respective adjacent surfaces of a portion, indicated at 28 in Fig. 4, of the material 23, this spacing accommodating swinging movement of the portion 28 between the outwardly flared free end portions of the flanges 27, about an axis extending longitudinally of the blade and the adjacent portion of the arm. Thus, the material 23 has spaced portions attached to and retained against bodily pivotal movement with respect to the blade 15 and 13, and an intermediate portion which accommodates relative movement between the blade and arm.

In the operation of the device, the blade 15 is inclined with respect to the plane of the windshield surface and as the arm 13 and blade 15 are oscillated in one direction over this surface, the beaded-attaching portion 29 of the material 23 is retained against bodily pivotal movement with respect to the arm, the portion 28 swinging against one of the side flanges 27. As the direction of oscillation is reversed, the portion 28 swings to engage the opposite flange 27, thus accommodating pivotal movement of the blade 15 with respect to the arm 13. The inclination of the blade results from flexibility of the material 23, the latter being placed under stress in accommodating such inclination. As the blade and arm reach the limit of travel in one direction there is a momentary pause before reversal of direction and the force built up through stress of the rubber in accommodating the inclination returns the blade to a position substantially perpendicular with respect to the windshield surface so that upon movement of the arm and blade in the opposite direction, the blade will be oppositely inclined. By causing the blade to assume the substantially perpendicular position between the change in direction of travel, any tendency of the blade to be moved in the opposite direction without changing the inclination thereof is overcome. Where the inclination of the blade is not so changed, there is a resultant clatter of the blade on the windshield surface. There is little, if any, noise resulting from the engagement of the material 23 with the flange 27 and while the change of the position of the portion 28 incidental to change in the direction of travel of the blade is relatively fast, there is not present a "slapping" action for the reason that such change in position of the portion 28 is accompanied by gradual build-up of opposition as the material is stressed.

In the form of the invention illustrated in Figs. 6, 7 and 8, the arm 13' has an enlarged attaching end indicated at 30 having a bead receiving section for slidably receiving the bead attaching portion 29' of the material 23, the latter being slipped into the portion 30 from the free end of the latter to engage a shoulder 31. The free ends of the flanges 32 of the attaching portion 30 are flared outwardly with respect to the portion 28' of the material 23' in a manner similar to the arrangement of the flanges 27 in Figs. 1–5. Otherwise the construction, arrangement of parts, and operation of parts is the same as that set forth in the previously described arrangement, like parts being identified by corresponding numerals.

A further modification of the invention is illustrated in Figs. 9 and 10 wherein the arm 13" has a portion thereof encasing the material 23", the attaching member 24" being embedded in the latter, and the ends thereof attached to a respective pair of flanges 22" of the connecting member 20" by the securing members 25". In this form of the invention the aforementioned parts are normally carried by the actuating arm 13 and are detachably secured to the wiper by pin 33 extending through the flanges 19" and 18", the flanges 21" and the wiping strip 16". The latter has a neck 34 connecting the main body thereof with the end portion 35 which has stepped opposite wiping surfaces. In the operation of this form of the invention relative movement between the wiper and arm is had through compression of the material 23", the force built up during compression acting to restore the blade to a substantially perpendicular position as in the foregoing embodiments of the invention.

In the form of the invention illustrated in Figs. 11 and 12, the actuating arm 13a has an opening 36 in the top wall or web thereof in which is snapped the beaded portion 37 of the material 23a for securing the latter to the arm. The portion 29a of the yieldable material is retained against bodily pivotal movement relative to the arm and the free end portions of the flanges 27a are flared outwardly from the portion 28a of the material 23a. The connecting member 24a is embedded in the yieldable material and projects therefrom for connection with the pairs of flanges 22a of the connecting member 20a, the latter being detachably secured to the blade 15a by the threaded engaging parts indicated at 38. The operation of the form of the invention herein illustrated is the same as that set forth in connection with the description of Figs. 3–5, and reference is made thereto.

Although but several embodiments of the invention are herein shown and described, it will be understood that various changes in the size, shape and arrangement of parts may be made without departing from the spirit of my invention and it is not my intention to limit said invention other than by the terms of the appended claims.

I claim:

1. In a cleaner, a wiping strip adapted for reciprocatory movement over a surface to be cleaned, a relatively rigid carrier for said strip, an actuating arm for said strip and carrier having spaced opposed securing flange portions, and means including a body of rubber-like material connecting said arm and carrier accommodating pivotal movement of the latter relative to said arm, said material having a portion thereof disposed between said flanged portions and secured thereby against bodily pivotal movement with respect to said arm and having another portion thereof spaced from said flanges for swinging movement relative thereto whereby to accommodate said pivotal movement, said swinging portion of said material being engageable with said flanges to limit the extent of said swinging movement.

2. In a windshield cleaner including a wiper and an actuating arm therefor having spaced opposed securing flanges, and means including a body of yieldable resilient material connecting said arm and wiper and accommodating pivotal movement of the latter relative to said arm about an axis generally longitudinally of the latter, said material having a portion thereof disposed between and secured by said flanges against bodily pivotal movement with respect to said arm and having another portion thereof spaced from said flanges for swinging movement relative thereto whereby to accommodate said pivotal movement, said swinging portion of said material being engageable with said flanges to limit the extent of said swinging movement.

3. In a cleaner, a wiper element adapted for reciprocatory movement over a surface to be cleaned, a relatively rigid carrier for said element, a channel-shaped actuating arm for said element and carrier, and a body of yieldably resilient material connecting said arm and carrier, having a part thereof extending into said channel arm and retained therein against bodily swinging movement relative thereto, said body further including a second part depending from the first named part disposed in spaced relation to the free end portions of the side walls of said arm and adapted to freely swing between said end portions relative to the first mentioned portion and said arm, said swingable part being secured to said carrier.

4. In a cleaner, a wiper blade adapted for reciprocatory movement over a surface to be cleaned, a backing for said blade, an actuating arm for said blade and backing having side flanges and securing flanges spaced longitudinally of said arm, and a body of resilient material operatively connecting said arm and backing, said material extending between said side flanges and interlocked with said securing flanges, the free end portions of said side flanges being spaced from the respectively adjacent side faces of a portion of said material whereby said portion is swingable relative to said arm about an axis longitudinally of the latter, said swingable portion of said material being secured to said backing, said flanges being engageable with the respective adjacent side faces of said swingable portion to limit swinging movement of the latter.

5. In a cleaner, a wiper blade adapted for reciprocatory movement over a surface to be cleaned, an actuating arm therefor having a portion thereof channel-shaped in cross section, an intermediate portion of the walls of said channel converging to form a bead-receiving section and the free end portions thereof being flared, and means including a body of resilient material connecting said blade and arm, said material having a beaded portion detachably fitted in said beaded receiving section and retained against bodily pivotal movement with respect to said arm, a portion of said material extending between the flared ends of said walls in spaced relation thereto for attachment to said wiper blade, said last mentioned portion being swingable with respect to said arm to accommodate relative movement between said arm and wiper blade.

6. In a cleaner, an actuating arm including a trough-shaped portion having walls thereof arranged to form a confining part, a wiper element adapted for actuation by said arm, and a body of rubber-like material for operatively connecting said arm and element having an enlarged bead at one edge thereof received in said confining part and retained against bodily pivotal movement, side walls of said trough outwardly of said confining part being spaced laterally from the side faces of the edge of said body opposite the first mentioned edge to freely accommodate limited swinging movement of the second mentioned edge relative to said arm, said swinging edge being operatively secured to said wiper element.

WRAY C. HANSEN.